(12) United States Patent
Ruisinger et al.

(10) Patent No.: US 9,573,077 B2
(45) Date of Patent: Feb. 21, 2017

(54) SOLIDS MAKER COOLING TOWER

(71) Applicant: SPX Cooling Technologies, Inc., Overland Park, KS (US)

(72) Inventors: Tom Ruisinger, Overland Park, KS (US); Ken Mortensen, Bonner Springs, KS (US); Bruce Weeks, Prairie Village, KS (US)

(73) Assignee: SPX COOLING TECHNOLOGIES, INC., Overland Park, KS (US)

( * ) Notice: Subject to any disclaimer, the term of this patent is extended or adjusted under 35 U.S.C. 154(b) by 844 days.

(21) Appl. No.: 13/628,870

(22) Filed: Sep. 27, 2012

(65) Prior Publication Data
US 2013/0087291 A1    Apr. 11, 2013

Related U.S. Application Data

(60) Provisional application No. 61/543,960, filed on Oct. 6, 2011.

(51) Int. Cl.
| | | |
|---|---|---|
| *B01D 1/00* | (2006.01) | |
| *F28F 27/00* | (2006.01) | |
| *B01D 1/16* | (2006.01) | |
| *F28F 25/06* | (2006.01) | |
| *F28C 1/16* | (2006.01) | |

(52) U.S. Cl.
CPC . *B01D 1/00* (2013.01); *B01D 1/16* (2013.01); *F28C 1/16* (2013.01); *F28F 25/06* (2013.01); *F28F 27/003* (2013.01)

(58) Field of Classification Search
CPC .......... B01D 1/00; B01D 1/16; Y10S 261/11; Y10S 165/90; F28C 1/00; F28C 1/02; F28C 1/04; F28C 1/16; F28F 27/003; F28F 25/087; F28F 25/06; F28F 19/006

USPC .......... 261/98, 109, 111, 130, 159, DIG. 11; 165/900; 159/5, 49
See application file for complete search history.

(56) References Cited

U.S. PATENT DOCUMENTS

| | | | | |
|---|---|---|---|---|
| 3,707,277 | A * | 12/1972 | Phelps ........................ | 261/23.1 |
| 3,800,553 | A | 4/1974 | Engalitcheff, Jr. | |
| 3,807,145 | A * | 4/1974 | Engalitcheff et al. .......... | 96/357 |
| 4,048,265 | A * | 9/1977 | Fordyce .................... | F28C 1/04 |
| | | | | 239/568 |
| 4,337,216 | A * | 6/1982 | Korsell ...................... | 261/112.2 |

(Continued)

FOREIGN PATENT DOCUMENTS

| | | |
|---|---|---|
| CN | 201724587 | 1/2011 |
| CN | 201781504 | 3/2011 |
| WO | 02090264 A2 | 11/2002 |

OTHER PUBLICATIONS

First Office Action issued by Chinese Patent Office on Dec. 3, 2014 for Chinese Patent Application No. 201280049308.4.

(Continued)

*Primary Examiner* — In Suk Bullock
*Assistant Examiner* — Jonathan Miller
(74) *Attorney, Agent, or Firm* — Baker and Hostetler LLP (57) ABSTRACT

A cooling tower that concentrates solids is described, wherein the cooling tower employs a fill material and a set of louvers that are positioned adjacent to the fill material. The cooling tower also employs a buildup prevention system that is permanently affixed to the cooling tower. The buildup prevention system is positioned adjacent to the fill material and configured to reduce solid buildup on the fill material louvers in the set of louvers.

10 Claims, 6 Drawing Sheets

(56) References Cited

U.S. PATENT DOCUMENTS

| | | | |
|---|---|---|---|
| 5,003,789 A * | 4/1991 | Gaona | F24F 5/0035 |
| | | | 261/25 |
| 5,127,992 A | 7/1992 | Davies et al. | |
| 5,569,415 A * | 10/1996 | Phelps | 261/23.1 |
| 6,070,860 A * | 6/2000 | Kinney et al. | 261/30 |
| 8,129,692 B2 | 3/2012 | Winfield et al. | |
| 2003/0085476 A1* | 5/2003 | Kinney et al. | 261/109 |
| 2009/0099808 A1* | 4/2009 | Winfield et al. | 702/137 |
| 2012/0161340 A1 | 6/2012 | Sween | |

OTHER PUBLICATIONS

International Search Report and Written Opinion mailed Dec. 17, 2012 for PCT/US2012/057493.
Second Office Action dated Nov. 5, 2015 for CN 201280049308.4 with English Translation.

* cited by examiner

SOLIDS MAKER COOLING TOWER

PRIORITY

This application claims priority to U.S. Provisional Patent Application Ser. No. 61/543,960, titled "Solids Maker Cooling Tower", filed Oct. 6, 2011, the disclosure of which is hereby incorporated by reference in its entirety.

FIELD OF THE INVENTION

The present invention relates to a cooling tower. More specifically, the present invention relates to an evaporation cooling tower that functions and operates to build-up dissolved solids and concentrate said dissolved solids.

BACKGROUND

Modern cooling towers are typically operated to vent waste heat to the atmosphere. When the cooling towers are operated in this mode, care is taken to "blowdown" the cooling tower (i.e., to discharge water from the system in order to control concentrations of salt and other impurities in the circulating water). Such blowdown maintains a solids concentration in the water that does not produce solid precipitation in the basins, fill, or on the louvers which are typically located at the main wet dry interface of the tower. In modern fresh water cooling tower systems, solids concentration range from 0-2000 ppm total dissolved solids ("TDS").

SUMMARY OF THE INVENTION

Embodiments of the present invention advantageously provide a cooling tower, comprising: a fill material; a set of louvers positioned adjacent to the fill material; and a buildup prevention system permanently affixed to the cooling tower, wherein said buildup prevention system is positioned adjacent to the fill material and configured to reduce solid buildup on at least one of at least a portion of the fill material and at least some louvers in the set of louvers.

In another embodiment of the present invention, a method of concentrating a dissolved material in a liquid is provide, comprising the steps of: causing a first liquid to flow against a heat-transfer-promoting fill material; allowing air to flow through the fill material; promoting uniform flow of the air through the fill material using louvers; and reducing solid buildup on at least a portion of the fill material and on at least some of the louvers by utilizing a buildup prevention system that is permanently affixed to the cooling tower, wherein said buildup prevention system is positioned adjacent to the fill material.

In yet another embodiment of the present invention, a cooling tower is provided, comprising: transferring means for transferring heat from a liquid; promoting means for promoting substantially uniform air flow through the transferring means, wherein the promoting means are positioned adjacent to the transferring means; and preventing means for preventing solid buildup on at least a portion of the transferring means and promoting means that is permanently affixed to the cooling tower, wherein said preventing means is positioned adjacent to the transferring means.

DETAILED DESCRIPTION OF THE PREFERRED EMBODIMENT

Figure 1:
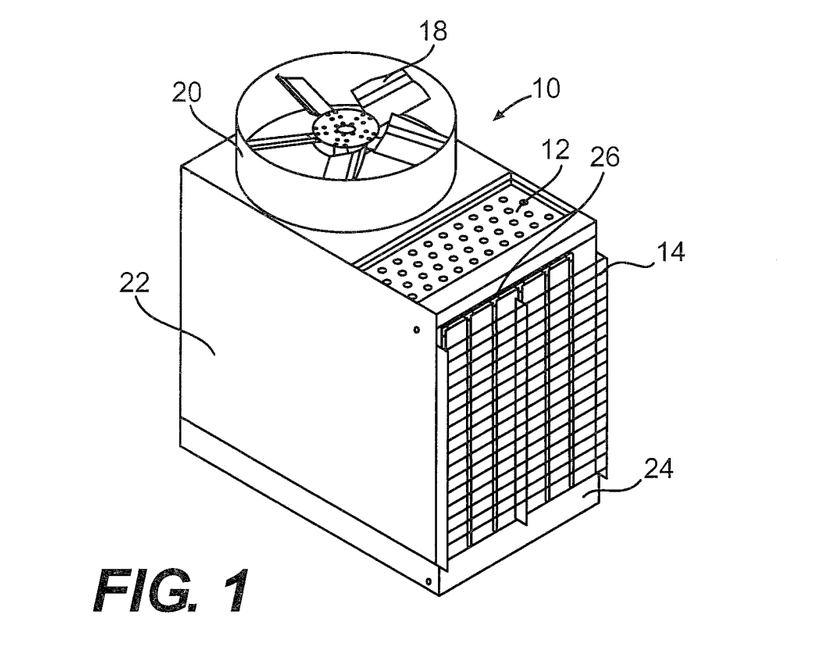
FIG. 1 is a perspective view of a cooling tower according to certain embodiments of the present invention.
Figure 2:
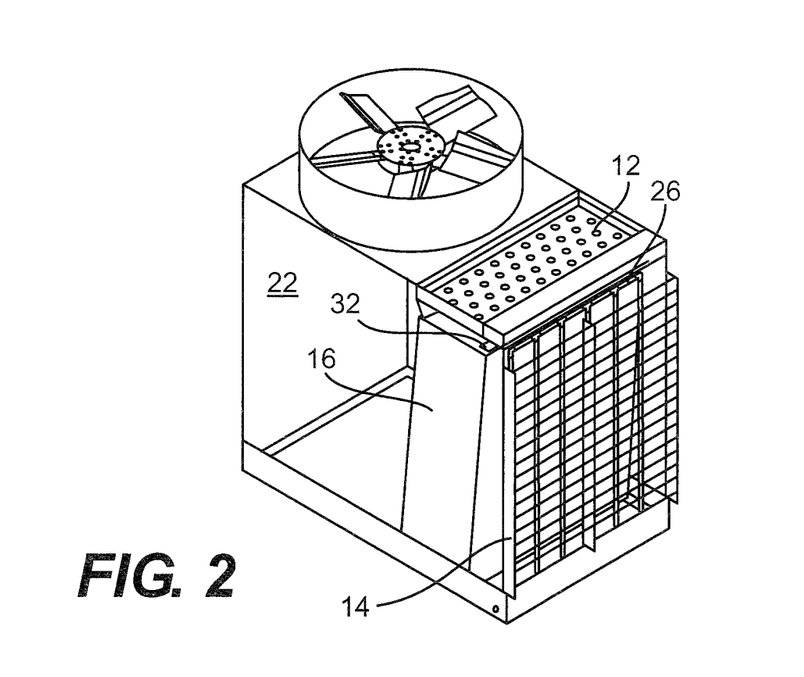
FIG. 2 is a perspective view of the cooling tower illustrated in FIG. 1 wherein a side casing panel has been removed.
Figure 3:
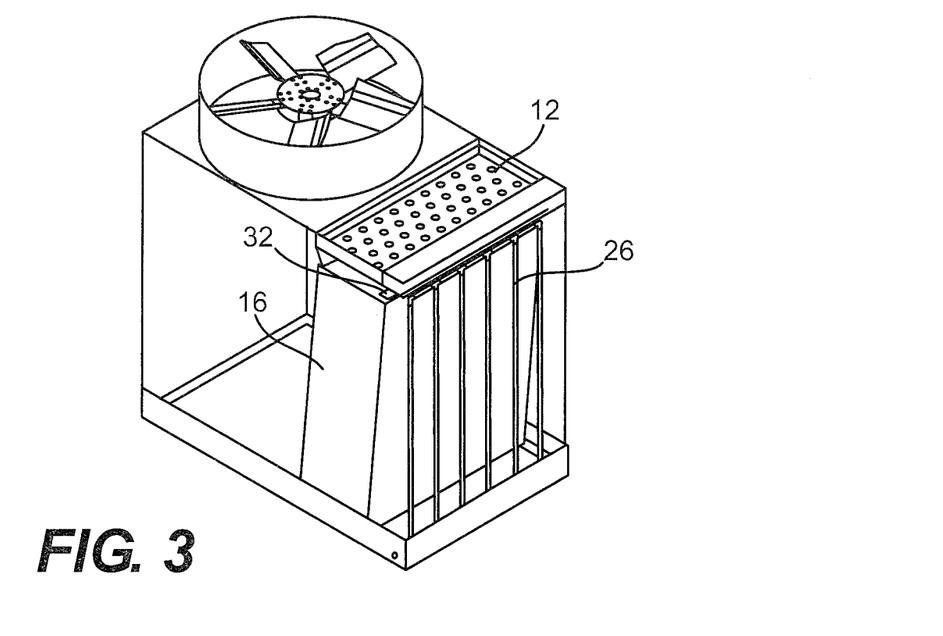
FIG. 3 is a perspective view of the cooling tower illustrated in FIG. 1 wherein a side casing panel and inlet louvers have been removed.
Figure 4:
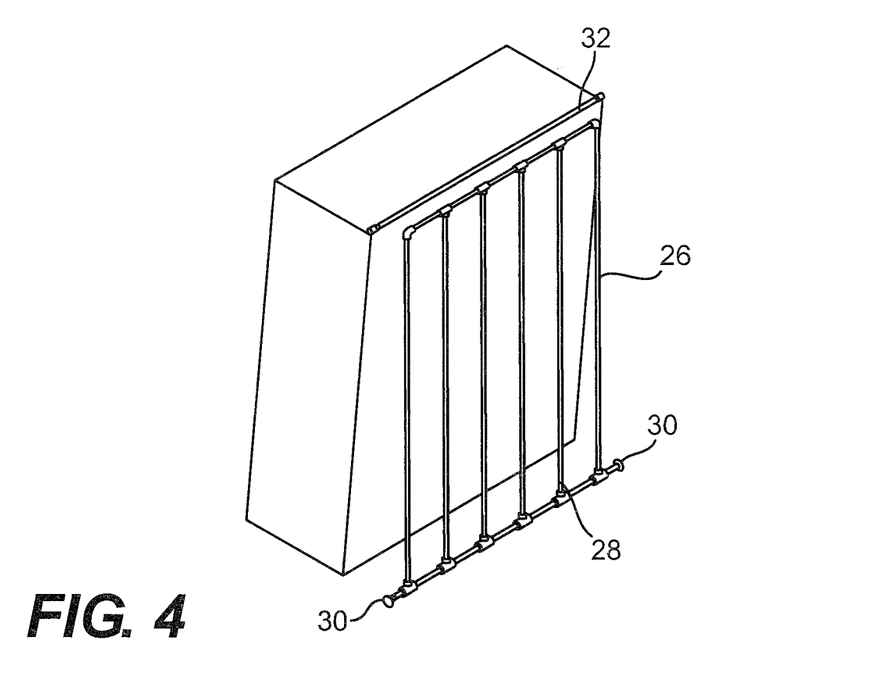
FIG. 4 is a perspective view of a portion of the fill material and buildup prevention system.
Figure 5:
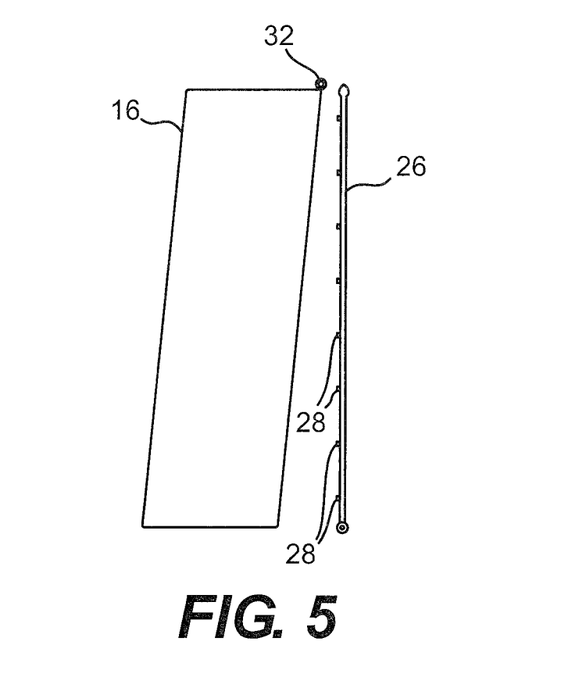
FIG. 5 is a side view of a portion of the fill material and buildup prevention system.
Figure 6:
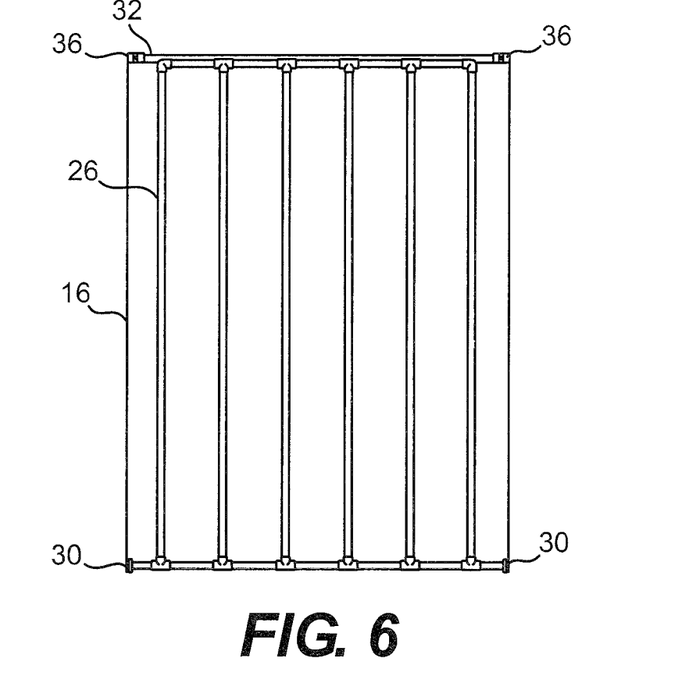
FIG. 6 is a front view of a portion of the fill material and buildup prevention system.
Figure 7:
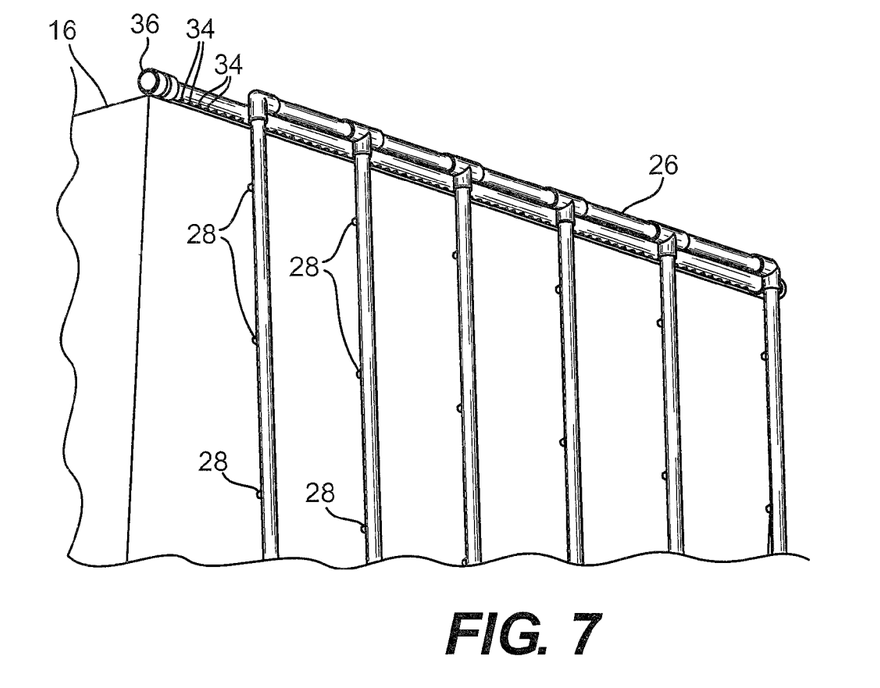
FIG. 7 is a perspective view of the upper portion of the buildup prevention system.
Figure 8:
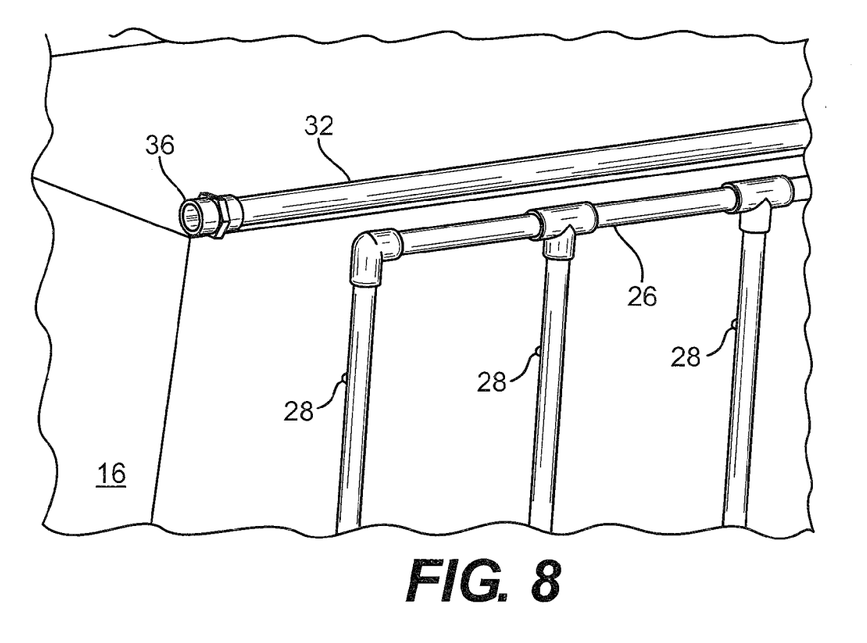
FIG. 8 is a close-up view of the upper portion of the buildup prevention system.
Figure 9:
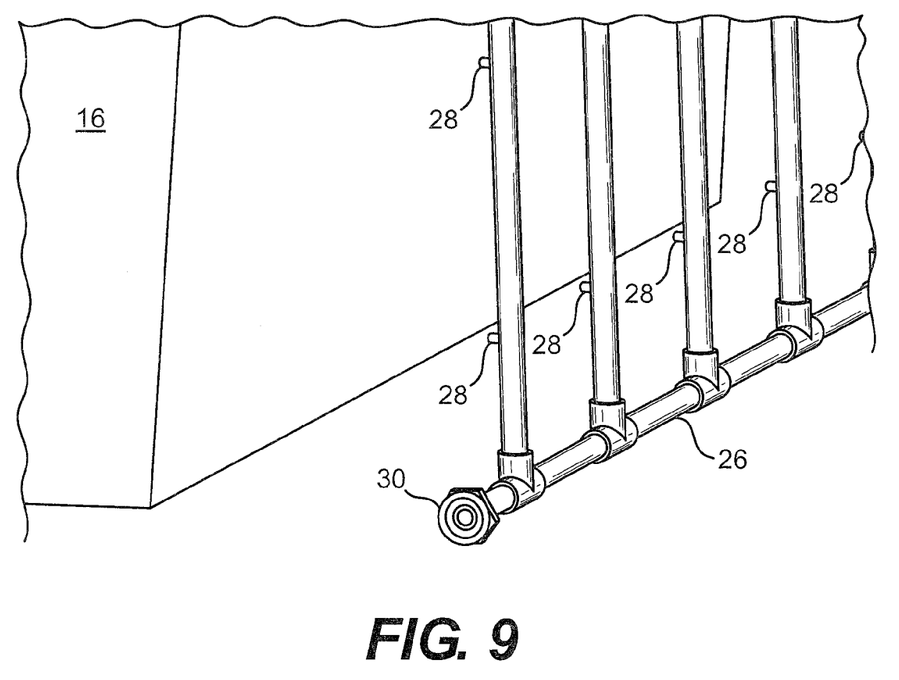
FIG. 9 is a close-up view of the lower portion of the buildup prevention system.
Figure 10:
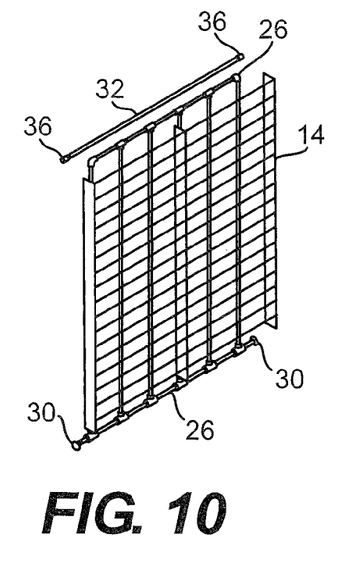
FIG. 10 is a perspective view of the buildup prevention system.
Figure 11:
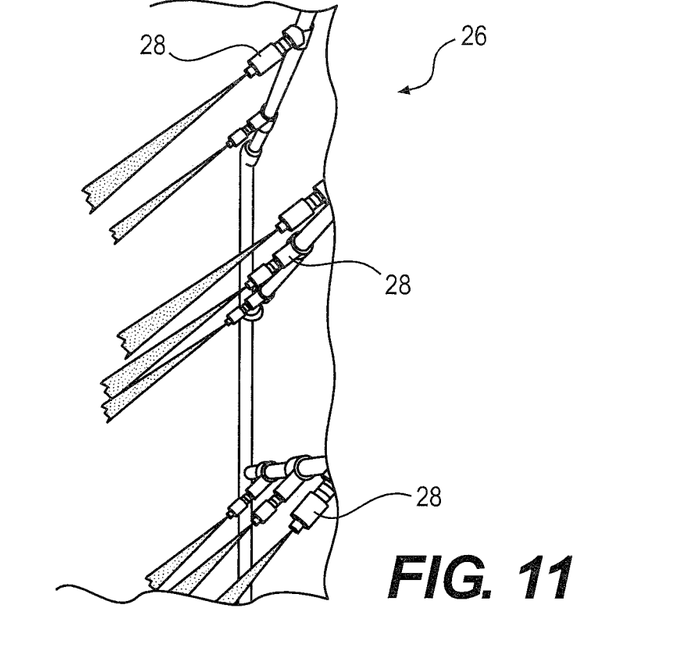
FIG. 11 is a perspective view of an array of spray nozzles included in the buildup prevention system.
Figure 12:
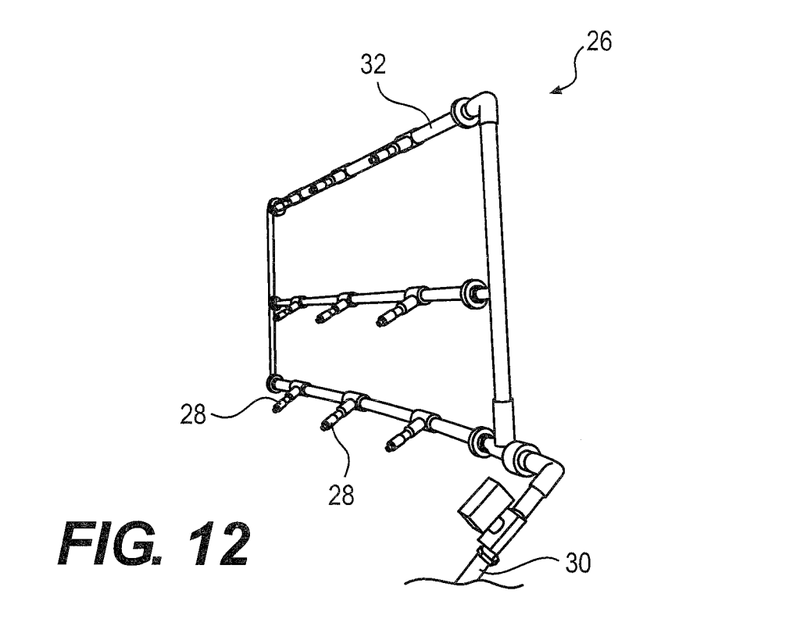
FIG. 12 is a perspective view depicting a broad view of the array of spray nozzles in FIG. 11.

FIG. 1 is a perspective view of a cooling tower 10 according to certain embodiments of the present invention. As illustrated in FIG. 1, the cooling tower 10 is contained within a casing 22. FIG. 2 is a perspective view of the cooling tower 10 wherein a side panel of the casing 22 has been removed. The cooling tower 10 is configured so that it can function as a concentrator/accumulator of solids in circulating water flowing therein. FIG. 3 is a perspective view of the cooling tower 10 wherein the louvers 14 and a side panel of the casing 22 have been removed. FIG. 4 is a perspective view of a portion of the fill material 16 and buildup prevention system. FIG. 5 is a side view of a portion of the fill material 16 and buildup prevention system. FIG. 6 is a front view of a portion of the fill material 16 and buildup prevention system. FIG. 7 is a perspective view of the upper portion of the buildup prevention system. FIG. 8 is a close-up view of the upper portion of the buildup prevention system. FIG. 9 is a close-up view of the lower portion of the buildup prevention system. FIG. 10 is a perspective view of the buildup prevention system. FIG. 11 is a perspective view of an array of spray nozzles 28 included in the buildup prevention system. FIG. 12 is a perspective view of depicting a broad view of the array of spray nozzles 28 in FIG. 11.

As illustrated in the figures, the cooling tower 10 includes a hot water basin 12, external air inlet louvers 14, a fill material 16 (i.e., fill), a fan 18, a fan shroud 20, a cold water collection basin 24, a fill air inlet washing system 26, spray nozzles 28, a washing system water inlet 30, a deluge pipe 32, deluge pipe orifices 34 and a deluge pipe inlet 36. The set of louvers 14 is positioned adjacent to the fill material 16. The washing system 26, which includes the spray nozzles 28 and the deluge pipe 32, is also positioned adjacent to the fill material 16. According to certain embodiments of the present invention, the washing system 26 functions as a buildup prevention system and is configured to reduce solid buildup all or at least a portion of the fill material 16 and/or all or at least some of the louvers 14 in the set of louvers 14.

The hot water basin 12 is located above all or at least a portion of the fill material 16. When the tower 10 is in operation, water in the hot water basin 12 flows down out of the basin 12, through the fill material 16 and into the cold water basin 24 where it is collected. The cold water basin 12 is located below all or at least a portion of the fill material 16.

The fan 18 and shroud 20 surrounding it are both located above at least a portion of the fill material 16. In operation, the fan 18 accelerates the flow of air through the tower 10.

As stated above, the washing system 26 includes the spray nozzles 28 which are positioned in an array. Typically, each nozzle 28 is effectively a horizontal component configured to spray a liquid (e.g., water with a low or negligible amount of soluble material dissolved therein) in a substantially horizontal direction toward a side of the fill material 16 that is closest to the nozzle 28. As such, all or at least a portion of the side of the fill material 16 closest to the washing system is sprayed by the liquid and liquid is also sprayed either completely through or, more typically, into at least a portion of the fill material 16. Louvers 14 that are positioned between the spray nozzles 28 and the fill material 16 are also typically sprayed.

It should also be noted that, in the tower 10 illustrated in the attached figures, the above-mentioned liquid that is sprayed though the nozzles 28 reaches the nozzles 28 by entering the washing system 26 through the washing system inlet 30. It then proceeds to travel through the various pipes that are also included in the washing system 26 located between the inlet 30 and each nozzle 28.

As also stated above, the washing system 26 includes a deluge pipe 32 that is, according to certain embodiments of the present invention, a pipe that extends either horizontally (or at least substantially horizontally) and parallel to an upper portion of the side of the fill material closest to the nozzles 28. In operation, a liquid (e.g., water with a low or negligible amount of soluble material dissolved therein) enters the deluge pipe 32 through the deluge pipe inlet 36 and leaves the deluge pipe 32 through one or more (typically all or substantially all) of the deluge pipe orifices 34. As such, the deluge pipe 32, according to certain embodiments of the present invention, functions as a vertical component configured to release a liquid in a substantially vertical direction adjacent to at least a portion of a side of the fill material 16.

Collectively, the water from the deluge pipe 32 and nozzles either dissolve solid buildup in the fill material 16 and/or louvers 14 or wash the solids down to the cold water basin 24. Once in this lower basin 24, the solids may be collected and removed from the tower 10. Alternatively, water in the cold water basin 24 can be removed from the tower 10 once the solute therein has reached a desire concentration. Optionally, new liquid may be introduced into the tower 10 to replace the removed liquid and/or solids. As yet another alternative, the cold water basin 24 may include a bottom outlet (not illustrated) (e.g., a drain) therein. This outlet may be used, according to certain embodiments of the present invention, to allow for relatively convenient removal of solids formed or collected in the cold water basin 24. Such solids may, for example, get swept toward the bottom outlet either by mechanical means or the fluid moving through the cold water basin 24.

According to certain embodiments of the present invention, a liquid regulation system is included, either within or external to the tower 10. This regulation system may include, for example, sensors and electronics that monitor the concentration of solutes in water contained within the tower 10 over time. This regulation system may also include, for example, any components known to those in the art as being used to operate traditional (i.e., currently available) cooling towers (e.g., actuators, valves, etc.). According to certain embodiments of the present invention, the regulation system is configured to introduce exterior liquid into the cooling tower when the liquid regulation system senses that the solid buildup surpasses a specified rate.

Another regulation system that may be used according to certain embodiments of the present invention is one that is configured to regulate and/or vary air/water ratios in the cooling tower 10. Such variation may be used, for example, to increase or even maximize evaporation depending upon the climate at the geographic location where the tower 10 is located. Any such regulation system may be used that would become apparent to one of skill in the art to use upon practicing an embodiment of the present invention.

According to certain other embodiments of the present invention, methods of concentrating a dissolved material (i.e., a solute) in a first liquid (i.e., water flowing from the hot water basin 12 and through the fill 16) are provided. According to some of these embodiments, the concentration reaches such elevated levels that precipitation of a solid form of the dissolved material results. Such precipitation can be promoted, for example, but allowing a relatively large amount of air or small amount of the first liquid into the tower 10 discussed above and/or introducing minimal or only relatively small amounts of additional liquid (e.g., water) over time. The solid form of the dissolved material (i.e., the precipitate) may then be collected and removed from the tower 10 (e.g., by scooping it out of the cold water collection basin 24). Alternatively, or in addition, an amount of concentrated first liquid (i.e., liquid having a relatively high concentration of dissolved material therein) can be removed from the tower 10 (again, typically from the collection basin 24).

According to some of these methods, the first liquid is caused to flow against a heat-transfer-promoting fill material (e.g., fill material 16). In tower 10, gravity is typically used to cause such flow.

While the above-discussed flow of the first liquid occurs, some methods according to the present invention allow air to flow through the fill material. In fact, a fan (e.g., fan 18) is sometimes operated adjacent to a portion of the fill material to promote such air flow. In the tower 10, the air flow is substantially perpendicular to the flow of water from the hot water basin 12 and accelerates the rate at which such water evaporates.

Some of the methods discussed herein also include promoting uniform flow of the air through the fill material using louvers (e.g., louvers 14). The louvers often also provide the additional benefit of controlling or reducing water splashout.

Using, for example, the above-discussed spray nozzles 28, certain methods according to the present invention include spraying a second liquid (e.g., water with a low or negligible amount of soluble material dissolved therein or "fresh" water) in a substantially horizontal direction against a portion of the fill material (e.g., the portion of the fill closest to the louver face). This, as will be appreciated by one of skill in the art upon practicing the present invention, reduces solid buildup on all or at least a portion of the fill material and on all or at least some of the louver by utilizing the above-mentioned buildup prevention system that is positioned adjacent to the fill material. In other words, the "fresh" water can be used to dissolve solids that build up on the louvers and/or in the fill material.

Using, for example, the above-discussed deluge pipe 32, certain methods according to the present invention also include the step of releasing a second liquid (e.g., "fresh" water) in a substantially vertical direction at a location that is adjacent to a portion (e.g., the louver face) of the fill material. This additional "fresh" water, when the spray nozzles 28 in tower 10 are in operation, effectively get deflected into the fill material 16 and/or onto the louvers 14 and aid in dissolving accumulated solids.

According to certain embodiments of the present invention, a concentration level of the dissolved material in the first liquid is maintained above a concentration level that causes precipitation of the dissolved material out of the first liquid. This elevated level, in some instances, is reached after the first liquid has travelled through all or most of the fill material, thereby allowing the precipitation to occur in or close to the cold water collection basin 24. According to some embodiments, a concentration level of total dissolved material in the first liquid of above 2500 ppm is maintained. According to other embodiments, a concentration level of total dissolved material in the first liquid of above 100,000 ppm is maintained. According to still other embodiments, a concentration level of total dissolved material in the first liquid of above 200,000 ppm is maintained.

As will become apparent to one of skill in the art upon practicing the present invention, cooling towers and methods of operation according to the present invention can have a number of advantages over currently available cooling towers and methods of operation. For example, the mode of operation of tower 10 can be particularly desirable if water disposal or remediation is restricted and/or expensive. Rather than experiencing solids buildup in the fill and/or on the louvers that could eventually cause degradation in evaporative performance and, ultimately, cooling tower shutdown, cooling towers according to the present invention dramatically reduce the water volume needed. Also, some cooling towers according to the present invention eliminate or at least greatly reduce the need to manually pressure wash the louvers and/or louver face of the fill.

In summary, each of the embodiments of the above-described cooling tower 10 is designed specifically as a solids concentrator and is intended to build-up dissolved solids to their limit of precipitation and/or beyond. The cooling tower 10 preferably achieves the precipitation limit in order to drive off the maximum amount of water practical with an evaporative device, thereby leaving less water to be removed via supplemental drying processes which are oftentimes less energy efficient. The aforementioned solids concentration levels of the cooling tower are intended to be well beyond the practical or typical long-term operating limits of evaporative cooling towers. Accordingly, the above-described wash system is intended to compliment or otherwise assist the high solids concentration effort by spraying or "washing" the evaporative fill media's wet/dry interface, the location of first precipitation, to specifically move or wash solids off of said interface. The aforementioned removal or washing allows for the likelihood of the continued or long-term operation of the cooling tower.

Turning back to the nozzles employed in the wash system, they are preferably positioned to allow for the spraying of the entire wet/dry interface areas of the fill and, in one embodiment of the present invention, in a fixed location. In one embodiment of the present invention, the nozzles provide a full cone spray pattern, however alternatively, a square pattern may be provided as well. In yet another preferred embodiment, the nozzles are wide angle spray greater than 90° for example. Moreover, the nozzles may be placed on approximately 12" centers. The above-described arrangement and geometry allows for the nozzle arrays to be placed about 6" away from the louver face. Furthermore, the centerline of the nozzle spray may be rotated from horizontal to an angle approximately equal to the angle of the louvers. The nozzles are also preferably of the design and make such that the spray duration maybe on a set time sequence, as needed from multiple times per hour to multiple times per day to provide the intended effect of preventing solids build up. The pressure of this spray must be controlled to prevent damage to the evaporative cooling tower fill media, typically thin gauge plastic material. Accordingly, water pressure is preferably in the range from 5 to 25 psig, depending on the number of nozzles and total flow required.

As discussed, solids build rapidly at their saturation limit, affecting the condition at the wet/dry interface, and therefore periodic washings and/or temporary spraying systems are relegated ineffective in controlling the rate of growth of the solids. Such infrequent cleaning would thus significantly restrict or cease airflow through the unit fill. This described airflow is essential to the evaporative process.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A cooling tower, comprising:
a fill material;
a set of louvers positioned adjacent to the fill material; and
a buildup prevention system permanently affixed to the cooling tower, wherein said buildup prevention system comprises a water inlet, spray nozzles, a deluge pipe, deluge pipe orifices and deluge pipe inlet wherein said buildup prevention system is permanently positioned adjacent to the fill material on an outside wall of the cooling tower and configured to reduce solid buildup on at least one of at least a portion of the fill material and at least some louvers in the set of louvers;
wherein the set of louvers are further positioned between the spray nozzles and the fill material.

2. The cooling tower of claim 1, further comprising:
a basin located above at least a portion of the fill material.

3. The cooling tower of claim 1, further comprising:
a basin located below at least a portion of the fill material.

4. The cooling tower of claim 1, further comprising:
a fan located above at least a portion of the fill material.

5. The cooling tower of claim 1, wherein the each spray nozzle comprises a horizontal component configured to spray a liquid in a substantially horizontal direction toward at least a portion of a side of the fill material.

6. The cooling tower of claim 5, wherein the spray nozzles are positioned in an array.

7. The cooling tower of claim 1, wherein the deluge pipe comprises a vertical component configured to release a liquid in a substantially vertical direction adjacent to at least a portion of a side of the fill material.

8. The cooling tower of claim 7, wherein the deluge pipe extends substantially horizontally and parallel to an upper portion of the side of the fill material.

9. The cooling tower of claim 7, further comprising: a liquid regulation system configured to introduce exterior liquid into the cooling tower when the liquid regulation system senses that the solid buildup surpasses a specified rate.

10. The cooling tower of claim 1, wherein the deluge pipe extends horizontally and parallel to an upper portion of a side of the fill material closest to the spray nozzles.

\* \* \* \* \*